United States Patent Office 3,829,326
Patented Aug. 13, 1974

3,829,326
GLASSLINED PRODUCT AND A PROCESS FOR GLASSLINING
Shigeo Soejima and Akira Ohmura, Nagoya, and Koichiro Watanabe, Tokorozawa, Japan, assignors to NGK Insulators, Ltd., Nagoya, Japan
No Drawing. Filed Oct. 13, 1972, Ser. No. 297,348
Claims priority, application Japan, Jan. 27, 1972, 47/9,429
Int. Cl. C23d 5/02
U.S. Cl. 117—70 B                                   6 Claims

ABSTRACT OF THE DISCLOSURE

A corrosion-resisting and thermal-shock-resisting article having an iron substrate with a multi-layered glasslining, which includes a ground coat formed on the substrate and a cover coat formed on the ground coat, the cover coat having alternately disposed first enamel coat with a porosity of 5% to 13% and second enamel coat with a porosity of not greater than 4.5%. The first enamel coat contains 0.5% to 10% by weight of refractory ingredients having a particle size of not greater than 150 micon and consisting of silica, alumina, zirconia, titania, and/or mullite. The article is made by applying the ground coat by firing, overlaying one layer of cover enamel slip and one layer of cover coat frit on the ground coat, firing the layers at a temperature of 800° C. to 850° C., and repeating the overlaying and the firing of the layers of the cover enamel slip and the cover coat frit.

BACKGROUND OF THE INVENTION

Field of the Invention

This invention relates to a glasslined product and a process of glasslining. More particularly, the present invention relates to an article with a multi-layered glasslining which has a high corrosion-resistance and thermal-shock-resistance, and a process of glasslining.

Description of the Prior Art

As a result of rapid development of modern chemical industries, there is an ever increasing need for corrosion-resisting material which has a high resistance against various corrosive chemicals, e.g., strong acids, under severe operating conditions, such as under a high pressure at a high temperature. Glasslined products have a high corrosion-resistance which meets the need, so that they have been widely used in various chemical and petrochemical industries, including medicines, foods, dyestuffs, fertilizers, synthetic resins, synthetic rubbers, synthetic fibers, and the like. There is an increasing demand for better performance of such glasslined products especially for higher corrosion-resistance and higher thermal-shock-resistance.

Generally speaking, a glasslined product is a composite article having an iron substrate acting as a structural member and a corrosion-resisting glasslining which is adhered to the substrate by firing. The corrosion-resisting glasslining consists of a ground coat which is firmly adhered to the iron substrate and a cover coat formed on the ground coat. According to a conventional process of glasslining, the ground coat is formed by applying a separately prepared ground coat slip to sand-blasted or otherwise cleansed surface of an iron substrate by a spray gun, drying the slip, and firing the substrate with the dried slip applied thereon at 850° C. to 900° C. The ground coat slip is prepared by milling a ground coat frit, silica, clay, and an electrolyte, and water until a certain particle size is achieved. One or two layers of such ground coats are formed on the substrate surface. The cover coat of the conventional glasslined products is formed by applying a separately prepared cover coat slip on the surface of the ground coat, drying the cover coat slip, and firing the substrate having the ground coat with the cover coat slip at 800° C. to 850° C. The cover coat slip is prepared in a manner similar to the ground coat slip; namely, by milling a cover coat frit, clay, an electrolyte, and water until a certain particle size is achieved. The application and the firing of the cover coat are repeated, for instance, four to eight times, until a desired thickness of the glasslining is obtained. The total thickness of the glasslining inclusive of the ground and cover coats is about 1.4 mm. to 1.6 mm.

The conventional glasslining has a shortcoming in that it includes gas bubbles formed therein, so that the porosity of the glasslining is about 10%. The gas bubbles are caused by the presence of clay and the electrolyte in the ground and cover coat slips, which are gasified during the firing. The gas bubbles tend to increase the contact area between glasslining and a corrosive liquid and to weaken the corrosion-resistance of the glasslining. The thermal-shock-resistance of the conventional glasslining is not quite high enough for certain applications.

Table 1 shows the chemical compositions of the aforesaid conventional ground coat frit and cover coat frit, which are also used in the glasslining of the present invention. The ingredients, as shown in Table 1, are all smelted and glassified.

TABLE 1

| | Ingredients (percent by weight) | | | | | | | | | | | | |
|---|---|---|---|---|---|---|---|---|---|---|---|---|---|
| | $SiO_2$ | $B_2O_3$ | $Al_2O_3$ | $Na_2O$ | $K_2O$ | $CaO$ | $F$ | $NiO$ | $CoO$ | $MnO_2$ | $TiO_2$ | $ZrO_2$ | $Li_2O$ |
| Ground coat frit: | | | | | | | | | | | | | |
| Minimum | 45 | 13 | 7 | 10 | 1 | 2 | 1 | 0.5 | 0.5 | 0.1 | | | |
| Maximum | 62 | 18 | 10 | 17 | 3 | 6 | 2 | 1.5 | 1.5 | 0.5 | | | |
| Cover coat frit: | | | | | | | | | | | | | |
| Minimum | 60 | 1 | 0.5 | 11 | 0.3 | 0.5 | 1 | | 0.5 | | 1 | 3 | 0.5 |
| Maximum | 70 | 7 | 4 | 18 | 4 | 4 | 3 | | 1.5 | | 5 | 8 | 3 |

SUMMARY OF THE INVENTION

Therefore, the primary object of the present invention is to provide a glasslined product which has both a high corrosion-resistance and a high thermal-shock-resistance.

Another object of the present invention is to provide a process of glasslining which has both a high corrosion-resistance and a high thermal-shock-resistance.

DETAILED DESCRIPTION OF THE PREFERRED EMBODIMENTS

A glasslined product according to the present invention comprises an iron substrate, a ground coat formed on the iron substrate surface, and a cover coat formed on the ground coat, the cover coat having alternately disposed first enamel coat with a porosity of 5% to 13% and second enamel coat with a porosity of not greater than 4.5%, each of the first enamel coat containing 0.5% to 10% by weight of refractory ingredients with a particle size of not greater than 150 micron. The refractory ingredients are preferably silica, alumina, zirconia, titania, and/or mullite. The outermost surface of the glasslined product according to the present invention should preferably be the second enamel coat.

The glasslining process for the glasslined product according to the present invention is as follows. A ground coat is formed on the iron substrate surface by a conventional method. A cover enamel slip is prepared by adding 0.5% to 10% by weight of refractory ingredients with a particle size of not greater than 150 micron in a conventional cover coat slip consisting of cover coat frit, clay, electrolyte, and water, said percentage of said refractory ingredients being based on the total dry weight of the cover enamel slip. The refractory ingredients are preferably silica, alumina, zirconia, titania, and/or mullite. The cover enamel slip is applied on the surface of the ground coat to form a layer of a first enamel coat by a conventional method. Separately, a cover coat frit having a particle size of not greater than 150 micron is applied on the aforesaid cover enamel slip to form a layer of a second enamel coat thereon. To ensure the uniform application, the cover coat frit to form the layer of the second enamel coat may preferably be dry powder mixed with a suitable binder and is applied by a dry spray gun. The cover coat frit to form the layer of the second enamel coat may be used by making it as an aqueous suspension or as a suspension in a suitable liquid. The layers of the cover enamel slip and the cover coat frit thus applied on the ground coat are dried and fired at a temperature of 800° C. to 850° C. The application and the firing of the layers of the cover enamel slip and the cover coat frit are repeated until a desired thickness of the glasslining is achieved.

The first enamel coat having the porosity of 5% to 13% and the second enamel coat having the porosity of not greater than 4.5% are derived from the layers of the cover enamel slip and the cover coat frit thus applied by firing, respectively. Therefore, it is preferable to employ the cover coat frit as the last application.

Instead of firing after applying one layer of the cover enamel slip and one layer of the cover coat frit, it is also possible to apply the additional layers of the cover enamel slip and cover coat frit before firing them.

The particle size of the refractory ingredients in the cover enamel slip is restricted to be not greater than 150 micron, and the amount of such refractory ingredients in the cover enamel slip is limited to 0.5% to 10% by weight, due to the following reasons. Judging from the conventional experiences of applying the cover coat slip in one operation, it is difficult to ensure the evenness of the cover coat if the particle size of the cover coat slip should exceed 150 micron. The use of large particle size for the cover coat slip tends to weaken the adherence between the cover coat with adjacent layers. If the quantity of the refractory ingredients is less than 0.5% by weight, based on the total dry weight of the cover enamel slip, the desired improvement of the thermal-shock-resistance of the glasslining cannot be achieved. On the other hand, the addition of the refractory ingredients in excess of 10% by weight, based on the total dry weight of the cover enamel slip, tends to deteriorate the adherence of the first enamel coat with adjacent layers and also to reduce the corrosion-resistance of the glasslining.

Each of the first enamel coats having a porosity of 5% to 13% and containing 0.5% to 10% by weight, based on the weight of the first enamel coat itself, of the refractory ingredients with a particle size of not greater than 150 micron has a high thermal-shock-resistance. On the other hand, each of the second enamel coats with a porosity of not greater than 4.5% has a high corrosion-resistance. With the glasslined product according to the present invention, a plurality of the first enamel coats, and a plurality of the second enamel coats are alternately overlaid on the ground coat, so that the advantageous properties of both the first and second enamel coats can be maintained in the final glasslined product.

The "porosity," as referred to in this specification, was determined by cutting each glasslined product at right angles to the surface thereof, polishing the cut edge surface, photographing the polished edge surface by a reflection microscope with a magnification of 100, and measuring the number and equivalent circle diameter of gas bubbles which were present on the photograph by a parti-size analyzer, e.g., type TGZ–3 made by Carl Zeiss, Germany. In the measurement, gas bubbles of not greater than 14.9 micron diameter were treated as bubbles of 14.9 micron diameter. Then, the total cross sectional areas of the bubbles was calculated, and the total bubble cross sectional area per unit area of the glasslining cross section was determined as the "porosity."

The invention will now be described in further detail, by referring to examples.

EXAMPLE

A ground coat slip was prepared by mixing 100 kg. of the ground coat frit of Table 1, 25 kg. of silica, 5 kg. of Gairome-clay, 0.2 kg. of sodium nitrite, 0.5 kg. of borax hydrate, and 65 kg. of water, and milling the ingredients of the slip by a trommel until the particle size of the slip became small enough to cause the mixture to completely pass through a JIS (Japanese Industrial Standard) sifting screen with 149 micron spacings, but large enough to cause 50 cubic centimeters of the slip to leave about 8 grams of residue on a JIS screen with 74 micron spacings.

A cover enamel slip was prepared by mixing 140 kg. of the cover coat frit of Table 1, 7.0 kg. of Gairome-clay, 0.7 kg. of potassium chloride, and 63.0 kg. of water, and milling the ingredients of the slip by a trommel until the particle size of the mixture became small enough to cause the slip to completely pass through the JIS sifting screen with 149 micron spacings, but large enough to cause 50 cubic centimeters of the mixture to leave about 10 grams of residue on the JIS screen with 74 micron spacings. The cover enamel slip thus prepared was divided into 14 equal parts. Thirteen specimens of the cover enamel slip according to the present invention, i.e., Specimens No. 1 to 13, were made by adding one or more refractory ingredients to the thirteen parts of the cover enamel slip, as shown in Table 2. The fourteenth part of the cover enamel slip was used as a Reference Specimen which represents a conventional cover coat slip for glasslining.

Separately, the cover coat frit having a particle size of not greater than 150 micron was prepared from the cover coat frit of Table 1.

The aforesaid ground coat slip was sprayed to sand-blasted surfaces of fourteen cans, each having an inner volume of 100 liters, and the ground coat slip thus sprayed was dried and fired at 890° C. The spraying and the firing of the ground coat slip were repeated twice on the surfaces of the fourteen cans, so as to form a ground coat of 0.3 mm. thickness on each can. The cover enamel slip of Specimens No. 1 to 13 of Table 2, were applied on the ground coat of the thirteen cans by the spray gun, respectively. The cover coat frit was applied on each of the thirteen cover enamel slip by the dry spray gun. The thicknesses of the layers of the cover enamel slip and cover coat frit were such that, when the layers of the cover enamel slip and the cover coat frit were fired, the ratio of (thickness of the first enamel coat/thickness of the second enamel coat) was between 1/1 to 1/2. After thoroughly drying, the layers of the cover enamel slip and the cover coat frit on the cans were fired at 820° C. The applying and the firing of the layers of the cover enamel slip and the cover coat frit were repeated four times, so that the mean thickness of the cover coat turned out to be 1.1 mm. The fourteenth or Reference Specimen of the cover coat slip was applied to the fourteenth can, in the same manner as the thirteen specimens according to the present invention, except the composition of the cover coat slip.

Of the fourteen cans tested, the thirteen cans of the present invention had good appearance, and no pin holes were found on the glasslined surfaces. The glasslined wall of each of the fourteen cans was cut at right angles to the surface, so as provide a cross section of the glass-lining, which cross section was polished for inspection by a microscope. By the microscopic inspection, it was found that each of the cover coat according to the present invention consisted of comparatively more porous layers (the first enamel coat) and comparatively less porous layers (the second enamel coat) which were alternately disposed one on the other. The porosities of the two enamel coats for each of the thirteen specimens of the present invention are shown in Table 2. It was found by the microscopic inspection that the cover coat of Reference Specimen had only comparatively highly porous layers.

Thermal-shock tests and corrosion-resistance tests were carried out on all the fourteen cans thus glass-lined. For the thermal-shock tests, each can was heated in an electric furnace at 190° C. for 30 minutes, and upon removal of the can from the furnace, the central portion of the can was suddenly chilled by injecting a water jet of 20° C. thereto. If such thermal-shock did not cause breakdown of the glass-lining, the can was reheated at a temperature which was 0° C. higher than the previous heating by the electric furnace for 30 minutes, and upon removal from the furnace, the central portion of the can was suddenly chilled by injecting the water jet of 20° C. thereto. When the breakdown of the glasslining occurred, the difference between the heated temperature at that time minus 10° C. and the temperature of the water is taken as the withstanding sudden temperature change for the glasslining, as shown in Table 2.

The corrosion-resistance tests were conducted in the following manner. Four square sections, each being 200 mm. times 200 mm., were taken from the side wall of each of the Specimens after the thermal-shock tests while avoiding those portions which were subjected to the thermal-shocks. The square sections were taken from each can by cutting with a flame while protecting the glasslining. The central portion of each of the square sections were cut by a high-speed cutter, so as to form a test piece of 80 mm. times 80 mm. square. To prevent the glasslining from peeling off from the test pieces, the edge surfaces of each test piece were carefully finished by a grinder. The test pieces thus prepared were cleansed by methyl alcohol, and dried in a drier at 100° C. for 1 hour, and cooled to room temperature in a desiccator. The weight of each of the test pieces thus cooled was accurately measured to the order of 0.1 mg. Two of the four test pieces for each Specimen were secured to the top and bottom open ends of a vertically disposed Pyrex (trademark of Corning Glass Works) glass cylinder of 50 mm. inner diameter and 110 mm. height, while inserting annular neoprene rubber packing between each cylinder end and the coacting test piece. Two stainless steel plates are attached to the top and bottom of the assembly of the Pyrex cylinder and the test pieces so as to sandwich the assembly therebetween. The two stainless steel plates were tightened together by bolts for liquid tightly securing the test pieces to the Pyrex glass cylinder. The Pyrex glass cylinder had a branch tube located at 25 mm. below its top edge for leading vapor in the cylinder to a recirculating cooler. One hundred cubic centimeters of a 20% hydrochloric acid solution, i.e., an acidic corroding liquid, was poured into the Pyrex cylinder through the branch tube, and the test assembly thus formed was then placed on an electric heating plate while connecting the branch tube to the recirculating cooler. The test pieces were exposed to the corroding fluid for two weeks at an elevated temperature by heating the corrodnig liquid in the Pyrex glass cylinder. The remaining two test pieces of each specimen were similarly tested by using an alkaline corroding liquid, i.e., a 1% sodium hydroxide solution. As shown in the notes 1 and 1 of Table 2, the heating temperature of the acidic and alkaline corroding liquids were at the boiling point of the hydrochloric solution and at 70° C., respectively. Thereby, the test pieces were exposed to the corroding liquid and vapor, or tested at liquid phase and at vapor phase. After exposing to the corroding fluid, the test pieces were washed thoroughly with water at first and then with methyl alcohol. The washed test pieces were dried in a drier at 100° C. 1 hour, and cooled to room temperature in the desiccator, so that the weight of each test piece could be accurately measured to the order of 0.1 mg. at room temperature. The weight reduction of the test piece by dissolution in the corroding fluid per unit area per unit time was determined based on the weight difference of the test pieces before and after the corrosion-resistance tests. The results are shown in Table 2.

As apparent from Table 2, the glasslined products according to the present invention have much better corrosion-resistance and thermal-shock-resistance, as compared with conventional glasslining represented by Reference Specimen of Table 2.

TABLE 2

| Specimen number | 1 | 2 | 3 | 4 | 5 | 6 | 7 | 8 | 9 | 10 | 11 | 12 | 13 | Reference specimen |
|---|---|---|---|---|---|---|---|---|---|---|---|---|---|---|
| Cover enamel slip (percent by weight): | | | | | | | | | | | | | | |
| Cover coat frit | 94.1 | 91.3 | 90.5 | 89.1 | 86.6 | 88.1 | 85.8 | 86.2 | 89.3 | 87.0 | 93.0 | 93.5 | 88.7 | 94.8 |
| Gairome-clay | 4.7 | 4.6 | 4.5 | 4.5 | 4.3 | 4.4 | 4.3 | 4.3 | 4.5 | 4.3 | 4.7 | 4.7 | 4.4 | 4.7 |
| Potassium chloride | 0.5 | 0.5 | 0.5 | 0.4 | 0.4 | 0.4 | 0.4 | 0.4 | 0.4 | 0.4 | 0.5 | 0.5 | 0.5 | 0.4 |
| Refractory ingredients: | | | | | | | | | | | | | | |
| Silica | 0.8 | 2.7 | | 5.3 | 8.7 | 4.4 | | | 1.8 | | | | 1.0 | |
| Alumina | | | 0.9 | 0.6 | | | 9.4 | | | 3.6 | | 1.4 | | |
| Zirconia | | 0.9 | 3.6 | | | | | 9.1 | | | 1.9 | | | |
| Titania | | | | | | 2.6 | | | 0.4 | 8.3 | | | | |
| Mullite | | | | | | | | | | | | | 6.5 | |
| Particle size (microns): | | | | | | | | | | | | | | |
| Minimum | 74 | 1 | 44 | 74 | 105 | 74 | 5 | 10 | 105 | 10 | 44 | 74 | 44 | |
| Maximum | 149 | 74 | 105 | 105 | 149 | 105 | 105 | 149 | 149 | 149 | 149 | 105 | 105 | |
| Porosity of cover coat (percent): | | | | | | | | | | | | | | |
| First enamel coat | 5 | 11 | 8 | 7 | 12 | 13 | 10 | 6 | 9 | 10 | 5 | 6 | 8 | 11 |
| Second enamel coat | 3 | 4.3 | 2.5 | 0.5 | 2 | 1.5 | 2.5 | 4 | 0.8 | 2.1 | 1.9 | 1.6 | 3.5 | |
| Properties of glass-lined products: | | | | | | | | | | | | | | |
| Corrosion-resistance in terms of weight reduction by dissolution (mg./cm.$^2$/day): | | | | | | | | | | | | | | |
| Acid resistance [1]: | | | | | | | | | | | | | | |
| Liquid phase | 0.007 | 0.012 | 0.008 | 0.006 | 0.010 | 0.011 | 0.009 | 0.008 | 0.007 | 0.008 | 0.007 | 0.006 | 0.010 | 0.015 |
| Vapor phase | 0.053 | 0.074 | 0.055 | 0.049 | 0.072 | 0.075 | 0.060 | 0.057 | 0.050 | 0.059 | 0.050 | 0.048 | 0.070 | 0.13 |
| Alkali-resistance [2]: | | | | | | | | | | | | | | |
| Liquid phase | 0.036 | 0.52 | 0.036 | 0.013 | 0.45 | 0.51 | 0.039 | 0.035 | 0.031 | 0.041 | 0.030 | 0.029 | 0.147 | 0.70 |
| Vapor phase | 0.004 | 0.008 | 0.005 | 0.003 | 0.007 | 0.007 | 0.006 | 0.005 | 0.004 | 0.005 | 0.003 | 0.003 | 0.007 | 0.011 |
| Thermal-shock resistance: | | | | | | | | | | | | | | |
| Withstanding sudden temperature change in thermal-shock test (° C.) | 220 | 230 | 230 | 240 | 250 | 240 | 250 | 250 | 230 | 240 | 220 | 220 | 240 | 200 |

[1] Resistance to 20% hydrochloric acid solution, tested at the boiling point of the solution for 2 weeks.
[2] Resistance to 1% sodium hydroxide solution, tested at 70° C. for 2 weeks.
[3] When sudden temperature difference which is 10° C. higher than the withstanding temperature change is applied, the glasslining is broken by the thermal-shocks.

What is claimed is:

1. A glasslined product comprising
an iron substrate,
a ground coat adhered to the iron substrate, and
a cover coat formed on the ground coat,
said cover coat having alternately disposed one upon the other a first enamel coat with a porosity of 5% to 13% and a second enamel coat with a porosity of not greater than 4.5%, said first enamel coat containing 0.5% to less than 10% by weight of at least one refractory ingredient selected from the group consisting of silica, alumina, zirconia, titania and mullite, with a particle size of not greater than 150 micron.

2. A glasslined product according to claim 1, wherein outermost layer of said cover coat is said second enamel coat.

3. A process of glasslining an iron substrate surface, comprising steps of
forming a ground coat on the substrate surface by firing;
applying a layer of a cover enamel slip on said ground coat, said slip consisting of a cover coat frit, clay, 0.5% to less than 10% by weight of at least one refractory ingredient selected from the group consisting of silica, alumina, zirconia, titania and mullite, with a particle size of not greater than 150 micron, an electrolyte, and water;
applying a layer of the cover coat frit alone on said layer of the cover enamel slip;
firing at a temperature of 800° C. to 850° C. after drying; and
repeating said application and firing of the two said layers until a desired thickness of the glasslining is obtained.

4. A process according to claim 3, wherein the final application is to use the layer of the cover coat frit.

5. A process of glasslining an iron substrate surface, comprising steps of
forming a ground coat on the substrate surface by firing;
applying a layer of a cover enamel slip on said ground coat, said slip consisting of a cover frit, clay, 0.5% to less than 10% by weight of at least one refractory ingredient selected from the group consisting of silica, alumina, zirconia, titania and mullite, with a particle size of not greater than 150 micron, an electrolyte, and water;
applying a layer of the cover coat frit alone on said layer of the cover enamel slip;
repeating the application of said layers of the cover enamel slip and the cover coat frit more than two times;
firing at a temperature of 800° C. to 850° C. after drying; and
repeating said application and firing of the layers until a desired thickness of the glasslining is obtained.

6. A process according to claim 5, wherein the final application is to use the layer of the cover coat frit.

References Cited

UNITED STATES PATENTS

| | | | |
|---|---|---|---|
| 3,639,164 | 2/1972 | Girard | 117—129 X |
| 2,786,782 | 3/1957 | Zimmerman et al. | 117—70 C |
| 2,828,218 | 3/1958 | Zimmerman | 117—129 X |
| 3,062,685 | 11/1962 | Sanford et al. | 117—70 C X |

RALPH HUSACK, Primary Examiner

U.S. Cl. X.R.

117—70 C, 97, 129